July 3, 1923.

L. H. CHARLING

AUTOMOBILE SIGNAL

Filed March 14, 1922

1,460,572

Witness:
R. E. Weber

Inventor:
Lewis H. Charling
By
Attorneys

Patented July 3, 1923.

1,460,572

UNITED STATES PATENT OFFICE.

LEWIS H. CHARLING, OF KENOSHA, WISCONSIN.

AUTOMOBILE SIGNAL.

Application filed March 14, 1922. Serial No. 543,559.

*To all whom it may concern:*

Be it known that I, LEWIS H. CHARLING, a citizen of the United States, and resident of Kenosha, in the county of Kenosha and State of Wisconsin, have invented certain new and useful Improvements in Automobile Signals; and I do hereby declare that the following is a full, clear, and exact description thereof.

The invention relates to devices adapted to be affixed to automobiles for the purpose of signalling the intent of the driver.

The invention comprises a housing secured to the frame of a machine by tubular supports and an arm pivoted thereto and normally positioned therein, retained in this position by a flexible retaining member passed through one of the tubular supports, a spring for urging the arm outwardly, and an electric lamp in the arm, the connections therefor leading through one of the tubular supports.

It is a primary object of the invention to provide a structure which is carried entirely on the outside of the body of the car so that it is not in the way of passengers and, therefore, not readily susceptible to being broken, which is pleasing in appearance, the mechanical features being united in a harmonious design, supporting a mirror, which is useful for determining the position of other vehicles.

The device, also, takes up a minimum of room, so that it is in nowise a burden.

An additional object is convenience of manipulation of the signal, the tensioning of the flexible retainer operating to withdraw the arm from signalling position, the retainer being secured by the mere positioning of a ring over a stud. The release of the ring permits the arm to move outwardly under the impulse of a spring, which throws the center of gravity of the arm beyond the line of support on its pivot, so that the operation of the device is entirely reliable, movement inwardly and outwardly being immediate and entirely at the will of the operator.

An important object is the provision of tubular members which perform the twofold function of supporting the housing in a rigid manner and, also, operate to conceal the flexible retainer and the electric leads.

With the above and other objects in view, which will appear as the description proceeds, my invention resides in the novel construction, combination and arrangement of parts, substantially as hereinafter described and more particularly defined by the appended claim, it being understood that such changes in the precise embodiment of the herein disclosed invention may be made as come within the scope of the claim.

In the accompanying drawing, I have illustrated one complete example of the physical embodiment of the present invention constructed according to the best mode I have so far devised for the practical application of the principles thereof, and in which.

Figure 1:
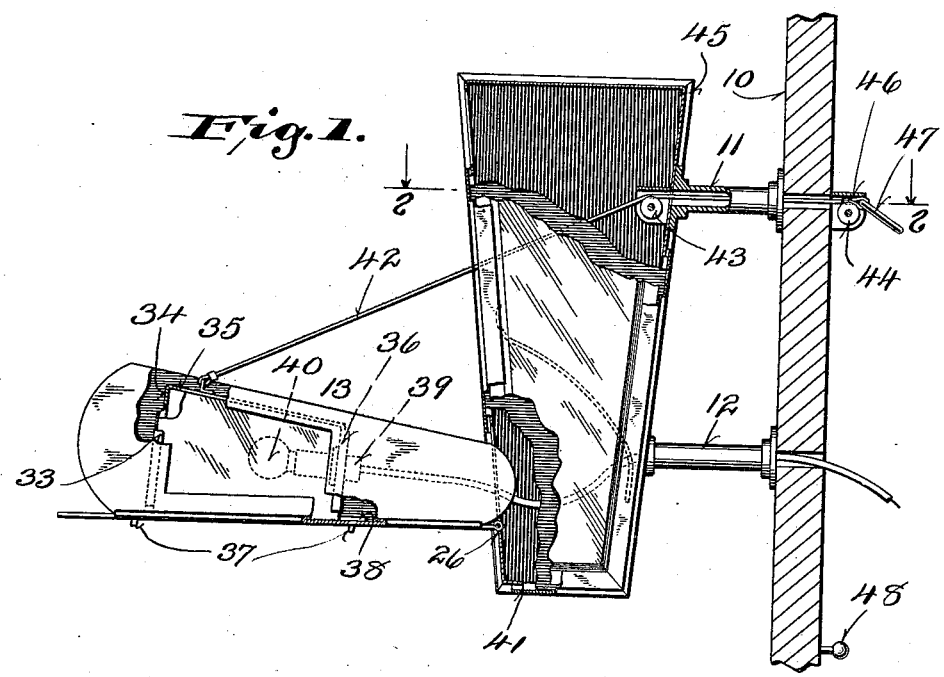
Figure 1 is a side elevation of the device as applied, the arm being in outer position and parts being in section.
Figure 2:
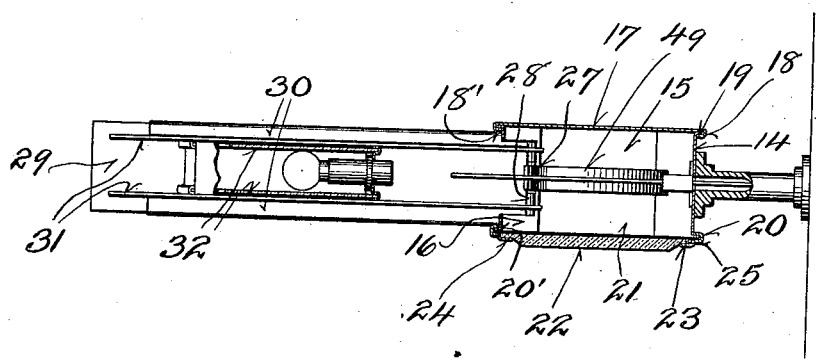
Figure 2 is a horizontal section on the line 2—2 of Figure 1.

To car body 10 tubular supports 11 and 12 are secured, being made rigid with the housing for the signal arm 13, the housing comprising an inner wall 14, a bottom wall 15, an outer wall 16 cut-away to permit the movement inwardly and outwardly of signal arm 13, and an upper wall. The walls are provided with peripheral flanges, the front wall 17 is directed inwardly and then laterally to provide flanges 18 and 19, flange 19 of inner wall 14 being received between flange 18 and outer wall 17. In this manner wall 17 is secured to other walls with which it contacts. Rearwardly extending walls 14 and 16 have laterally extending flanges 20 and 20', respectively. Against these flanges a backing member 21 for mirror 22 contacts the mirror having a reduced marginal portion 23. A frame member is provided having a rearward flat portion 24 contacting with marginal portion 23. The frame comprises a clamp 25 U-shaped in cross section and integral with rearward portion 24, the lateral stretches of the clamp securing the borders of backing member 21 against flanges 20, 20'. Thus the mirror 22 and backing member 21 are secured to the side walls of the housing immediately contiguous. The frame member extends entirely about the periphery of the mirror.

Adjacent the opening in side wall 16 a pivot 26 is secured to the housing by an eye 27 formed in the middle of side wall 16. The pivot permits the rotation thereon of eye 28 formed in the middle of the bottom of plate 29 of signal arm 13. The middle of plate 29 is deformed to provide inwardly directed folds 30 with which frames 31 cutaway for glasses 32 are integral. Glasses 32 are supported in U-shaped grooves 33 of the casing comprising sides 34, 35, and 36. Sides 34 and 35 are secured to plate 29 by pins 37 directed through lugs 38 and side 36 is provided with a socket 39 for supporting lamp 40 from which lead 41 extends through the housing and support 12. Flexible retainer 42 is secured to side 35 and extends upwardly through support 11, being received on pulleys 43 and 44, pivotally mounted in supports 45 and 46, the former being rigid with the housing and the latter with the car body 10.

The position of parts shown in Figure 1 is that used normally for signalling purposes, the outer limit of movement of signal arm 13 is, therefore, determined by ring 47 contacting with support 46. On the moving downwardly of ring 47, arm 13 is enclosed in the housing in which it is secured when ring 47 is positioned over stud 48. On the release of tension on flexible retainer spring 49 secured to side wall 14 of the housing operates by its upper end to move the arm outwardly, the limit of movement of the spring being shown in dotted lines in Figure 1. When the center of gravity of the arm passes beyond the line of gravity extending through pivot 26, it has a further tendency to move outwardly being aided by the force of gravity.

It is apparent that very little of the mechanism extends within the car. Tubular members 11 and 12 conceal some of the operative parts of the device and contribute to the excellence of appearance thereof. Mirror 22 assists the driver by showing the positions of other cars. When the arm is completely housed, there is no emission of light to cause the driver any annoyance. When, however, the signal is thrown on, it becomes visible through glasses 32 and is effective for signalling purposes.

A contact breaker may be provided operative on the movement upwardly of signal arm 13 to extinguish the light.

I claim:—

An automobile signal comprising a casing having an open side wall, a closure member pivoted to said casing for closing the opening, a signal carried by said member, a spring having one end secured to a wall of the casing and a free end adapted to urge said member outwardly, a cable secured adjacent said signal, a tubular support secured to the car body, said car body having an aperture therein, a ring on the other end of said cable, said cable extending thru said tubular support and said aperture, and a stud on said body adapted to receive said ring whereby on the release of said ring from said stud, said spring is operative to move said signal outwardly to a position limited by the length of said cable.

In testimony that I claim the foregoing I have hereunto set my hand at Kenosha, in the county of Kenosha and State of Wisconsin.

LEWIS H. CHARLING.